US007539795B2

(12) United States Patent
Vahtola

(10) Patent No.: US 7,539,795 B2
(45) Date of Patent: May 26, 2009

(54) METHODS AND APPARATUS FOR IMPLEMENTING DYNAMIC SHORTCUTS BOTH FOR RAPIDLY ACCESSING WEB CONTENT AND APPLICATION PROGRAM WINDOWS AND FOR ESTABLISHING CONTEXT-BASED USER ENVIRONMENTS

(75) Inventor: Miika Vahtola, Oulu (FI)

(73) Assignee: Nokia Corporation, Espoo (FI)

( * ) Notice: Subject to any disclaimer, the term of this patent is extended or adjusted under 35 U.S.C. 154(b) by 96 days.

(21) Appl. No.: 11/343,603

(22) Filed: Jan. 30, 2006

(65) Prior Publication Data

US 2007/0180407 A1    Aug. 2, 2007

(51) Int. Cl.
*G06F 3/048* (2006.01)
(52) U.S. Cl. .................. 710/67; 710/1; 710/8; 710/9; 710/10; 710/14; 710/36; 713/1; 713/2; 702/1; 702/2
(58) Field of Classification Search ............... 710/8–10, 710/67, 1, 14, 38; 715/847; 713/1, 2; 702/2, 702/1
See application file for complete search history.

(56) References Cited

U.S. PATENT DOCUMENTS

| 6,055,536 | A | * | 4/2000 | Shimakawa et al. ......... 707/101 |
| 6,158,011 | A | * | 12/2000 | Chen et al. ..................... 726/15 |
| 7,143,065 | B1 | * | 11/2006 | Enright ............................ 705/43 |
| 2002/0156870 | A1 | * | 10/2002 | Boroumand et al. ......... 709/219 |
| 2003/0208472 | A1 | * | 11/2003 | Pham ................................ 707/2 |
| 2004/0001098 | A1 | | 1/2004 | Numano ........................ 345/773 |
| 2005/0243067 | A1 | | 11/2005 | Anspach et al. ............... 345/172 |
| 2006/0143578 | A1 | * | 6/2006 | Maktedar ....................... 715/847 |
| 2006/0209035 | A1 | | 9/2006 | Jenkins et al. ................. 345/172 |

FOREIGN PATENT DOCUMENTS

| CA | 2361455 A1 | 5/2003 |
| EP | 1107544 A2 | 6/2001 |
| EP | 1289237 A2 | 3/2003 |

* cited by examiner

*Primary Examiner*—Tammara Peyton
(74) *Attorney, Agent, or Firm*—Harrington & Smith, PC

(57) ABSTRACT

The invention disclosed herein concerns methods and apparatus for implementing dynamic shortcuts for use in navigating web content and application program windows. In particular, the methods and apparatus of the invention allow a user to associate one or more items selected from web content or application program windows with a dynamic shortcut. In one aspect of the invention, a user assigns a keyboard shortcut to one or more web pages viewed during the browsing session. Once assigned a keyboard shortcut, the one or more web pages can be rapidly accessed using the keyboard shortcut. In variations of the invention, the one or more web pages may be assigned an icon accessible from, for example, the desktop. In other aspects of the invention the keyboard shortcut or icon is associated with content or resources derived from multiple sources; such as, for example, web pages located using a browser and application program windows spawned using an application program.

47 Claims, 5 Drawing Sheets

METHODS AND APPARATUS FOR IMPLEMENTING DYNAMIC SHORTCUTS BOTH FOR RAPIDLY ACCESSING WEB CONTENT AND APPLICATION PROGRAM WINDOWS AND FOR ESTABLISHING CONTEXT-BASED USER ENVIRONMENTS

TECHNICAL FIELD

The invention disclosed herein generally concerns navigation between windows in a graphical user interface and more particularly concerns methods and apparatus for creating dynamic shortcuts to be used both for navigating between web pages and windows, and for establishing context-based user environments.

BACKGROUND

When surfing the Internet, users often access numerous web pages and switch back and forth between web pages. The visited web pages may be displayed in a graphical user interface either singly or simultaneously (such as, for example, in tabbed, framed or tiled formats). In addition, a user often alternates between web surfing and performing productivity tasks using an application program. In performing productivity tasks using an application program the user typically has a number of windows associated with the application open as well. Navigation among a plurality of web pages and application program windows in conventional operating systems and browsers is often difficult, clumsy and time-consuming due to the relatively limited number of controls available to a user.

Conventional browsers typically have several facilities available for navigating between web pages accessed during a web browsing session. These comprise back/forward arrows accessible from a tool bar; a favorites list; a history file of visited pages; and an address bar. Each of these has limitations for assisting a user in navigating between web pages accessed during a web browsing session. The back/forward arrows often are useful in navigating between web pages that have been most recently visited, but are less useful in attempting to return to a web page that was, for example, visited early in a web browsing session. Often, browsing activities may interrupt a sequence of visited pages, thereby making it impossible for a user to return to a previous web page using the back/forward arrows. Even if it is possible to return to a previously-visited web page using the back/forward arrows, there may be many intervening pages, making it difficult and time-consuming to return to the desired previously-visited web page.

Generally, users retain the favorites list for entry or banner web pages. Adding every web page visited during a web surfing session to a favorites list is not only time-consuming, but also defeats the purpose of the favorites list. It effectively clogs the favorites list with a plurality of web pages that are of interest only for a particular web surfing session. In addition, the web pages have to be added to the favorites list using a number of cumbersome pointing device operations. Then, when the user seeks to revisit the web page, the user has to access the favorites list again and locate the desired web pages in what may now be a very crowded list. Finally, when a particular web surfing session is completed, the user may have to delete a number of web sites from the favorites list to return the favorites list to a more streamlined manner of operation.

The history file of visited pages also has limitations. For example, the history file catalogs pages with insufficient granularity to make it easy to find a particular web page within the list. In addition, the sheer volume of web pages listed may make it difficult to find a particular web page.

The foregoing problems are all encountered within the context of a web browsing session. As described previously, though, web browsing may occur concurrently with productivity operations performed using application programs. Typically, one or more windows associated with application programs will be open during these operations. In conventional graphical user interfaces associated with operating systems there is no easy way to switch between web pages associated with a browser and windows associated with an application program. A user typically has to perform a series of surface/submerge operations using task bar functionality. In no known graphical user interface is there a control to allow users to switch between a collection of web pages and application windows.

These problems are further compounded when the browsing activities occur in a small electronic device, such as a cellular telephone or a personal digital assistant with internet browsing capability. Such devices have small displays, meaning it may be impractical to have more than one web page or application program window displayed at a time.

From a more expansive perspective beyond those limited to web-browsing activities, computer users may have several or more distinct modes for using a computer. For example, a user may pay bills on-line once a month. While paying bills on-line, the user may also have a favorite picture displayed (related to bill-paying) and favorite music playing, where the picture is displayed and the music is played with software associated with the computer. Each month when the user returns to perform the bill-paying task, there is no simple way to re-establish the desired bill-paying environment, other than by launching each application individually. This can be time-consuming and burdensome and possibly ineffective since a previous bill-paying environment often has to be re-established from memory. Thus, a computer user may have several desired computer environments associated with certain activities or productivity tasks. There is no known way to store these computer environments for later recall.

Accordingly, those skilled in the art desire methods and apparatus for implementing functionality associated with web browsers or graphical user interfaces that enable users to quickly navigate between a subset of web pages during a web browsing session In addition, those skilled in the art desire methods and apparatus that enable users to quickly switch between a subset of web pages and application program windows open during a particular computer session. Further, those skilled in the art desire methods and apparatus that allow a user to store favorite operating environments, wherein the favorite operating environments comprise a combination of two or more web pages; application programs; computer functions; or computer resources.

SUMMARY OF THE PREFERRED EMBODIMENTS

The foregoing problems are overcome, and other advantages are realized, in accordance with the presently preferred embodiments of these teachings.

A first embodiment of the invention comprises a memory medium storing a computer program executable by a digital processor of an electronic device, the electronic device having a display for displaying a graphical user interface, wherein when the computer program is executed by the digital processor operations are performed for creating a keyboard shortcut for navigating between resources capable of being displayed in the graphical user interface, the operations comprising: receiving a command to associate at least a first resource with the keyboard shortcut; associating the first resource with the keyboard shortcut; detecting entry of a key sequence corresponding to the keyboard shortcut associated with the first resource; and displaying the first resource in the graphical user interface of the electronic device in response to the detection of the entry of the key sequence corresponding to the keyboard shortcut.

A second embodiment of the invention comprises a memory medium storing a computer program executable by a digital processor of an electronic device, the electronic device having a display for displaying a graphical user interface, wherein when the computer program is executed by the digital processor operations are performed for creating a shortcut for navigating between resources capable of being displayed in the graphical user interface, the operations comprising: receiving commands to associate a plurality of resources with the shortcut; associating each of the plurality of resources with the shortcut; detecting entry of a command corresponding to the shortcut; and displaying at least one of the plurality of resources in the graphical user interface.

A third embodiment of the invention comprises an electronic device comprising: at least one memory for storing a computer program; a display for displaying a graphical user interface operable to display resources accessed using the electronic device; an input device for entering commands to control the electronic device; and a digital processing apparatus coupled to the at least one memory, display and the input device for executing the computer program stored in the at least one memory, wherein when the program is executed operations are performed for creating a shortcut using the input device, the shortcut for navigating between resources capable of being displayed in the graphical user interface, the operations comprising: receiving commands to associate a plurality of resources with the shortcut; associating each of the plurality of resources with the shortcut; detecting entry of a command corresponding to the shortcut; and displaying at least one of the plurality of resources in the graphical user interface.

A fourth embodiment of the invention comprises a method for creating a keyboard shortcut for navigating between resources capable of being displayed on a graphical user interface, the method comprising: receiving a command to associate at least a first resource with the keyboard shortcut; associating the first resource with the keyboard shortcut; detecting entry of a key sequence corresponding to the keyboard shortcut associated with the first resource; and displaying the first resource in the graphical user interface of the electronic device in response to the detection of the entry of the key sequence corresponding to the keyboard shortcut.

A fifth embodiment of the invention comprises a method for creating a shortcut for navigating between resources capable of being displayed in a graphical user interface, the method comprising: receiving commands to associate a plurality of resources with the shortcut; associating each of the plurality of resources with the shortcut; detecting entry of a command corresponding to the shortcut; and displaying at least one of the plurality of resources in the graphical user interface.

A sixth embodiment of the invention comprises an electronic device comprising: memory means storing at least a computer program; display means for displaying a graphical user interface operable to display resources accessed using the electronic device; input device means for entering commands to control the electronic device; and processor means coupled to the memory means, display means and input means for executing the computer program stored in the at least one memory, wherein when the program is executed operations are performed for creating a shortcut using the input device, the shortcut for navigating between resources capable of being displayed in the graphical user interface, the operations comprising: receiving commands to associate a plurality of resources with the shortcut; associating each of the plurality of resources with the shortcut; detecting entry of a command corresponding to the shortcut; and displaying at least one of the plurality of resources in the graphical user interface.

A seventh embodiment of the invention comprises a memory medium storing a computer program executable by a digital processing apparatus of an electronic device, the electronic device having a display for displaying a graphical user interface, wherein when the computer program is executed by the digital processing apparatus operations are performed for creating a shortcut both for navigating to a resource capable of being displayed in the graphical user interface and for implementing at least one function of the electronic device, the operations comprising: receiving a command to associate the resource with the shortcut; receiving a command to associate the at least one function of the electronic device with shortcut; detecting a command corresponding to activation of the shortcut; displaying the resource in the graphical user interface of the electronic device; and implementing the at least one function of the electronic device.

In conclusion, the foregoing summary of aspects and embodiments of the invention disclosed herein is exemplary and non-limiting. For example, one skilled in the art will understand that one or more aspects or steps from one embodiment can be combined with one or more aspects or steps from another embodiment of the invention to create a new embodiment within the scope of the invention disclosed herein.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1A:
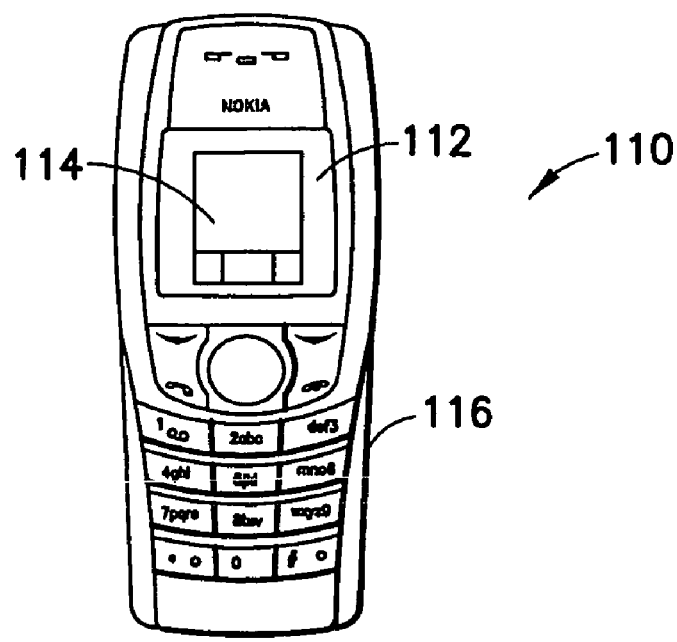
FIG. 1A depicts a portable communications device such as, for example a cellular telephone in which the methods and apparatus of the invention may be practiced.
Figure 1B:
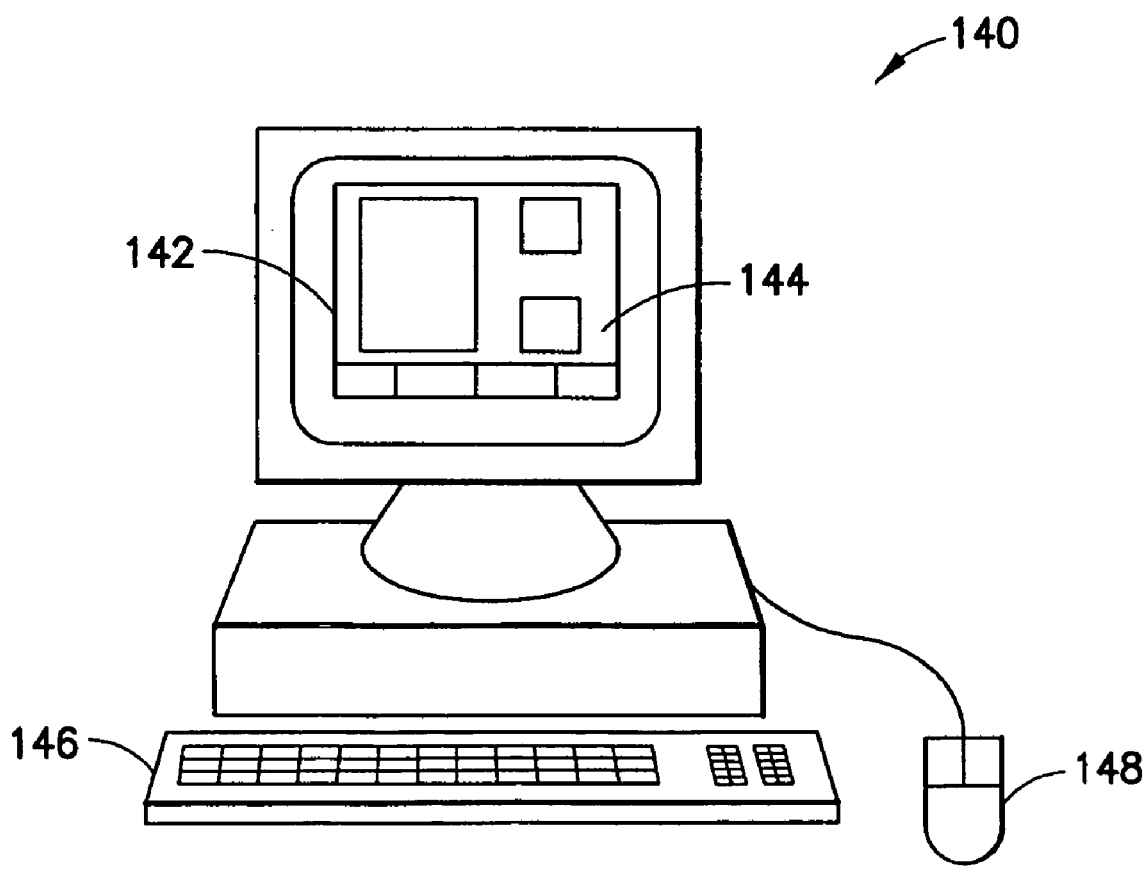
FIG. 1B depicts a desktop computer in which the methods and apparatus of the invention may be practiced.

FIGS. 1A-B depict typical electronic devices in which the methods and apparatus of the invention may be practiced. In fact, the methods and apparatus of the invention can be practiced in any electronic device having a graphical user interface for displaying resources (e.g., web pages), and an input device (e.g., keypads or keyboards) which can implement shortcuts. The terms "keypads" and "keyboards" are used interchangeably in this application to cover any command input system using multiple keys to enter commands. Keypads may be found on wireless telephones, personal digital assistants, wired/wireless remote controls, data gloves, etc. Accordingly, the methods of the invention may be implemented with keypads found in any of these control devices. The mobile terminal (cellular telephone) 110 depicted in FIG. 1A has a display 112 displaying a graphical user interface 114 and a keypad 116 for entering numbers and commands. Various key combinations implemented with the keys of the keypad 116 are used in embodiments of the invention to implement shortcuts. The desktop computer 140 comprises a display 142 for displaying a graphical user interface 144 and keyboard 146 and pointing device (e.g., mouse) 148. Each of the mobile terminal 110 and desktop computer 140 further comprises at least one memory for storing at least one computer program which, when executed, performs operations in accordance with methods of the invention; a digital processor for executing the computer program; and a network interface or wireless transceiver for accessing web content.

Figure 2A:
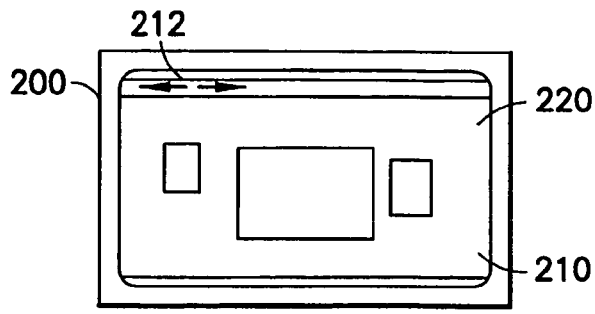
FIGS. 2A-E depicts a method operating in accordance with the invention in a graphical user interface of an electronic device.
Figure 2B:
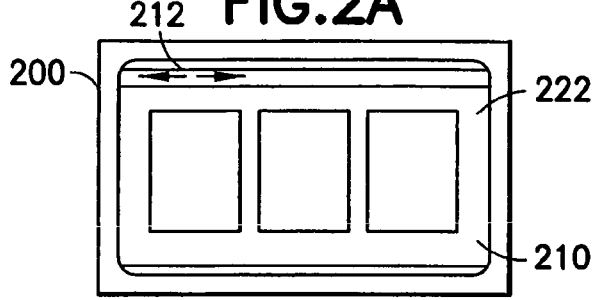
Figure 2C:
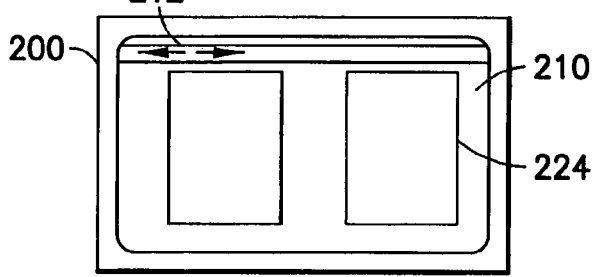
Figure 2D:
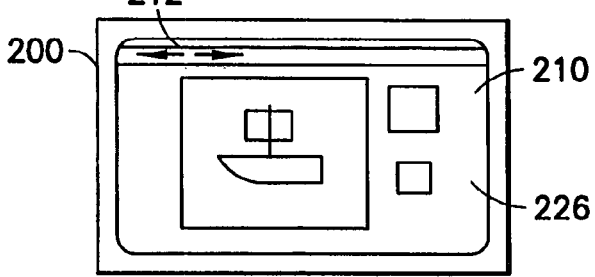
Figure 2E:
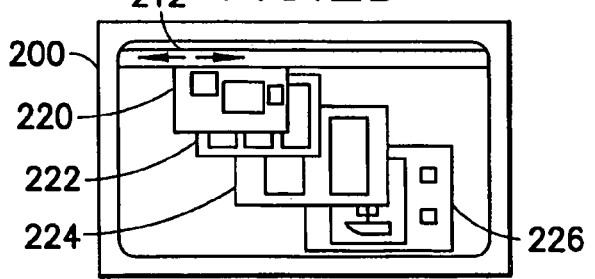

FIGS. 2A-E depict the effects of operations performed by one method of the invention. FIG. 2A shows a web page 220 displayed in a graphical user interface 210 of display 200. A user associates web page 220 with a keyboard shortcut implemented using a keyboard 146 of desktop computer 140. The user then navigates to web page 222, and the user associates web page 222 with the keyboard shortcut. The user next navigates to web page 224 and associates web page 224 with the keyboard shortcut. The user then launches a window 226 from an application program (e.g., an image editing program; a spreadsheet program; a music management and MP3 playback program, etc.), and associates the window 226 with the keyboard shortcut. After associating web pages 220, 222, 224 and window 226 with the keyboard shortcut the user navigates away from the web pages and window. At some later time, the user desires to return to the collection of web pages 220, 222, 224 and application program window 226 and enters the keyboard shortcut. The web pages 220, 222, 224 and application program window 226 are then displayed in the graphical user interface 210 of display 200 in response to detection of the keyboard shortcut.

Accessing an application program window may also cause a function to be performed. For example, the application program window may be associated with a media player such as, for example, an MP3 management and playback software suite. The window of the MP3 management and playback software suite may be the "playlist" window of the suite. State information reflected in the "playlist" window such as, for example, the MP3 that is currently being played and the contents of the playlist will be saved when the shortcut is created. If the user closes the MP3 management and playback software suite, and then at a later time selects the key combination corresponding to the shortcut, the MP3 management and playback software will be launched into a state corresponding to the state information saved when the shortcut was created. In other words, the MP3 playing when the shortcut was created will be re-played and the playlist reflected in the playlist window when the shortcut was created will be reestablished.

In more general embodiments, a function associated with a shortcut may not correspond to a function that has to be launched through a graphical user interface. For example, a user may associate a series of maintenance tasks with a shortcut, followed by a command to turn off the device implementing the shortcut. The command to turn off the device may not be one that is ordinarily implemented through a graphical user interface. Nonetheless, in embodiments of the invention the command can be associated with the shortcut.

Methods of the invention save information relating to the arrangement of the web pages 220, 222, 224 and application program window 226 in the display device (such as, for example, position, size, orientation, etc.) when creating the shortcut. This is particularly advantageous when the methods of the invention are used in a computer attached to a large-screen monitor. The invention saves context information reflected in the arrangement of windows and web pages, thereby allowing a user to immediately re-establish the context associated with the web pages and application windows using the shortcut. This is particularly useful for persons performing monitoring activities of multiple items in, for example, financial services or security applications.

Figure 3A:
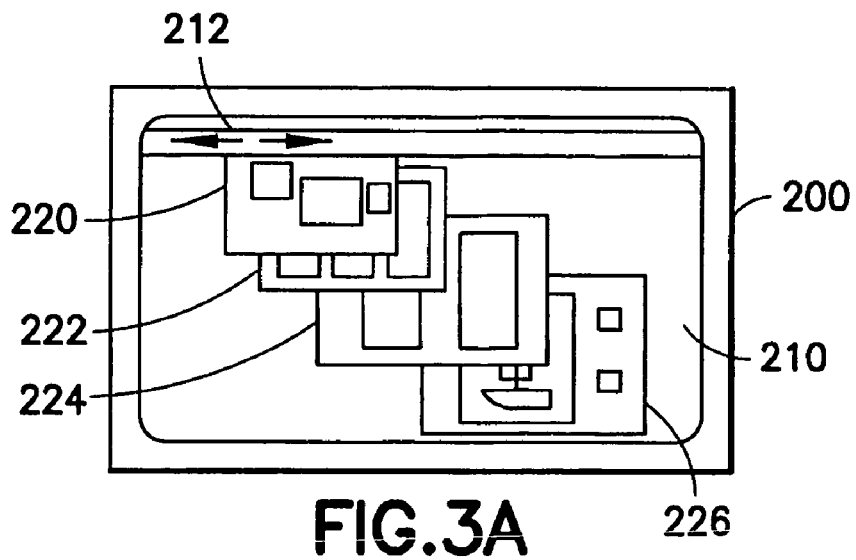
FIGS. 3A-C depicts a method operating in accordance with the invention in a graphical user interface of an electronic device.
Figure 3B:
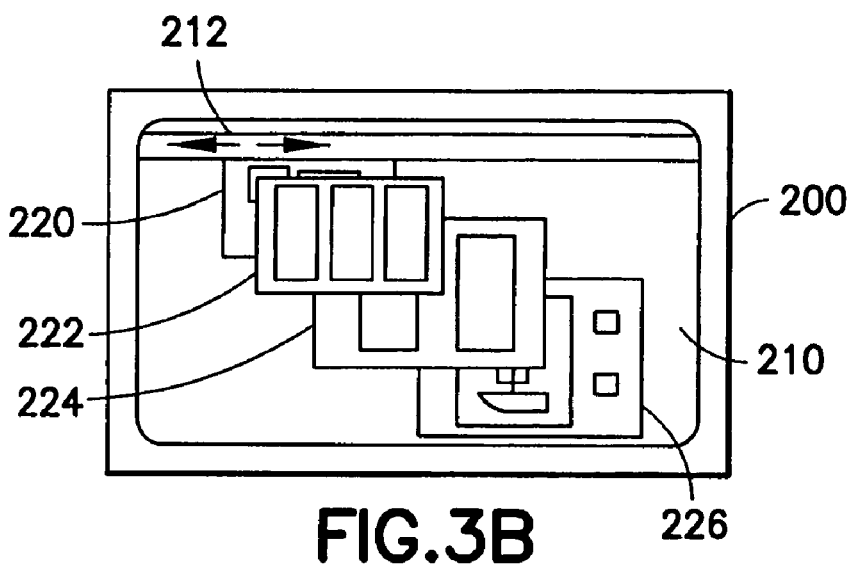
Figure 3C:
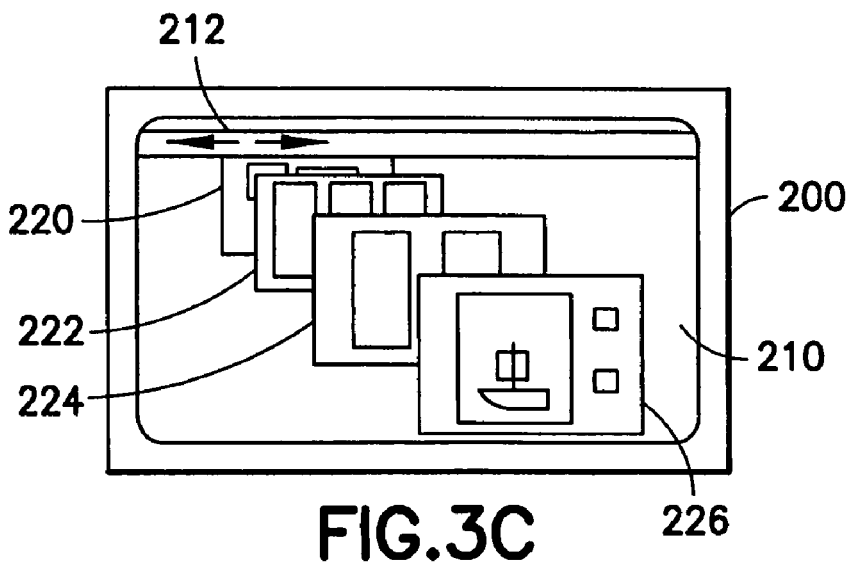

The methods of the invention can be integrated with other navigation controls typically associated with graphical user interfaces. For example, graphical user interface 210 in FIGS. 2A-E is depicted as having a back/forward control 212 for navigating between recently accessed content (e.g., web pages). In an embodiment of the invention, when a user accesses a keyboard shortcut associated with a collection of resources, the resources which are currently associated with the back/forward control 212 are cleared and the collection of resources associated with the keyboard shortcut becomes associated with the back/forward control 212. Thus, as depicted in FIGS. 3A-C, the user can employ the back/forward control 212 to navigate between the collection of resources recalled using the keyboard shortcut. As shown in FIG. 3A, the web pages 220, 222, 224 and application program window 226 are shown in a tiled manner, with web page 220 on top. The user enters a "forward" command with back/forward control 212 and this causes web page 222 to rise to the top as shown in FIG. 3B. The user enters additional "forward" commands with the back/forward control 212 and eventually web page 226 rises to the top as shown in FIG. 3C. Once at the state shown in FIG. 3C, if the user enters "back" commands with back/forward control 212, the graphical user interface eventually would return to the state shown in FIG. 3B, where web page 222 is on top. The tiled manner of display is just one way in which this aspect of a method of the invention may be practiced; for example, the web pages, when recalled, could be displayed one-at-a-time, with the first web page to be associated with the keyboard shortcut shown first.

Thus, in embodiments of the invention keyboard or other shortcuts (e.g., desktop icons) are used to quickly access user-selected web pages/content. This eliminates time-consuming, clumsy and inefficient methods of the prior art associated with conventional navigation tools. There are additional advantages of the invention. For example, a user can create multiple shortcuts, each associated with a different collection of resources. The user can then quickly alternate between the different collections by entering the shortcuts.

This is a particular advantage of the invention for it implements context-establishing shortcuts. Individuals may have several or more computer-use modes or mobile-terminal-use modes. Respecting multiple computer-use modes, a particular individual, for example, may have three distinctive computer use modes. In a first mode, the individual may listen to music while performing a productivity task such as, for example, paying bills on-line or digitally editing pictures or video, etc. In a second mode, the individual may watch a live sports event using a tv tuner incorporated in the computer while at the same time being logged into a sports website that provides a real-time box score of the live sports event. In a third mode, the individual may perform financial management operations using both a personal finance software package and an on-line stock management web site while simultaneously watching a financial news show. Using the shortcuts of the invention, the individual can recall a particular computer use context with context-establishing shortcuts, and can quickly switch between computer use contexts. In addition, since shortcuts can implement functions as described previously, a user need not enter additional keystrokes to, for example, initiate playback of a DVD. Similar advantages are encountered with mobile terminals, personal digital assistants, remote controls in media computers, game controllers associated with computer games, etc.

Shortcuts are also dynamic since the shortcuts can be modified (e.g., re-mapped to a new resource) anytime within a session. Thus, shortcuts are implemented on-the-fly. Changing resources associated with a shortcut can be implemented in various ways. For example, in certain embodiments of the invention a shortcut is associated with a single resource at a time. In such embodiments, when a new resource is associated with a shortcut, it replaces the resource previously associated with the shortcut. In other embodiments, like those depicted in FIGS. 2 and 3, multiple resources can be associated with a shortcut. The former embodiment is known as an exclusive insert shortcut, where an old resource is replaced by a new resource. The latter embodiment is known as an inclusive append shortcut, where multiple resources can be associated with a shortcut.

When using the append mode the user associates several windows/views having specific content with the same shortcut and thus creates an aggregate view during the session where all important data can be shown simultaneously. This allows a user to utilize the shortcut to access quickly all the views associated with the shortcut, as shown in FIGS. 2A-E. Hence, in situations where a user has associated windows launched from several application programs with a shortcut it will be possible to launch several applications simultaneously with the shortcut.

Therefore, dynamic shortcuts are a flexible way to access quickly the most important information/web pages/windows a user has encountered within a web surfing or productivity session. Graphical user interfaces offering dynamic keyboard shortcuts operating in accordance with the invention are more adaptive to a user's way of working.

Also, shortcuts in embodiments of the invention can be implemented with other input functionality such as icons displayed in a graphical user interface. A shortcut icon can be placed, for example, in a specific dynamic shortcut area on a sidebar of an operating system, or in a desktop, or in a browser area. Additionally, a shortcut icon can be implemented as a thumbnail image of view(s) associated with the shortcut, or reflective of icons used to launch applications that have views associated with a corresponding shortcut.

In one mode of operation, shortcuts implemented in accordance with the invention are session-specific. Session-specific shortcuts can be used to quickly access a previously-used function/window/application/web page later within the same session. In one possible implementation, the shortcuts would be implemented as icons and placed in a specific temporary shortcut icon area associated with, for example, an operating program.

When creating shortcuts within a session a user creates navigation points for his or her current workflow. In a session-specific embodiment, these shortcuts are available for use within the session in which the shortcuts were created but disappear when a user logs out or shuts down the computer or mobile terminal. In other embodiments to be described, the shortcuts can be saved for use in a later session. In still further embodiments, a back-up facility is provided which saves shortcuts from a previous session if the previous session should end prematurely as a result of, for example, a computer crash. In even further embodiments, a user-established number of session-specific shortcuts are automatically saved in an "invisible" manner at the end of session when, for example, the user logs out. In a user-established number of following sessions, the automatically-saved shortcuts will not appear in the session-shortcut area, but can be retrieved using, for example, a menu or control icon. This protects a user who forgets to save her session-specific shortcuts.

In embodiments where session-specific shortcuts are not implemented with keys but instead with, for example, icons, the shortcut icons are created using a menu system. In such an embodiment a menu would have an item available for selection entitled "create session specific shortcut". In embodiments where session-specific shortcuts may be saved for use in a later session, additional menu items would be available including, but not limited to, "save session-specific shortcut"; "save session-specific shortcut as"; "load session-specific shortcut"; and "delete session-specific shortcut".

Other embodiments of the invention purposefully implement shortcuts as persistent features, since shortcuts, particularly context-establishing shortcuts, are so useful in establishing a desired session environment. In these embodiments a user can advantageously record shortcuts created during a particular computer use session so that the shortcuts can be recalled at a later time. The shortcuts may relate to web surfing, productivity tasks, or other context-related computer activities. Recording of shortcuts can be implemented in various ways. For example, a user can activate an auto-save feature which records shortcuts for use in future sessions automatically. Alternatively, a user can manually start session shortcut recording anytime within a session by activating a recording function at a desired time. Recorded shortcuts are available for use in later sessions (e.g. can be appended to current shortcuts). Therefore, recorded shortcuts function as link collections and are very useful for recurrent frequent tasks. As explained previously, a user can create shortcut profiles for a given activity thus allowing shortcuts to be used in a context-specific way or to function as context-establishing shortcuts. This is important since the number of easily-remembered keyboard shortcuts may be limited.

As illustrated previously with respect to FIGS. 2A-E and the accompanying discussion, it is noted that shortcuts operating in accordance with the invention are not application-specific (i.e. restricted to a given application) but can be utilized system-wide.

Another advantage of the invention is that shortcuts can be implemented in a secure manner. For example, when a mobile terminal or desktop computer implementing shortcuts operating in accordance with the invention may be accessed and used by several users, a particular user's shortcuts can be protected by various security measures. For example, the user's shortcuts can be password-protected to prevent unauthorized access. In addition identity information indicating resources associated with a user's shortcuts can be encrypted.

Shortcuts operating in accordance with the invention are particularly useful in a web browsing context where only a single window can be viewed at a time. This is especially true when web browsing occurs in a mobile terminal like that depicted in FIG. 1A that is capable of only displaying a single screen at a time.

When shortcuts are implemented using a keyboard or keypad, the shortcuts comprise key combinations. The shortcuts are created the same way as they are used but the key/input device combination is a bit different. Generally speaking, shortcuts can be any kind of input combination created using various input devices attached to a device for handling input processing. For example, there could be a dedicated key combination to activate keyboard shortcut creation (e.g. the "My own" button and A-key of a Nokia communicator/or Ctrl+ Shift+A) and then a user only has to pick a single key or a key combination that will be later used with e.g. the "My own" button or Ctrl+Shift combination to access the linked view/ content. In order to create a dynamic shortcut to be associated with a given content (e.g. some part/item on a web page/ window), the content has to be active/activated (e.g., highlighted if it is textual or visual) so the system knows what is being linked/mapped to a given key combination so it can create required identification data. In somewhat like manner shortcuts can be used to access media players. In such embodiments, shortcuts are programmed to access not only playlists, but particular media items available in a playlist. Accordingly, when a keyboard shortcut programmed in such a manner is selected, the user can, for example, immediately initiate playback of a particular song in a playlist.

With regard to shortcut recording, a recording dialog will pop out when the user creates/defines a dynamic keyboard shortcut during a session. Later she can call this dialog with a specific key combination (e.g. "My own"+R or Ctrl+Shift+ R). In other embodiments for use by, for example, expert users, the process may be made more streamlined by omitting the dialogue. There would be an indication provided to the user that a shortcut had been created. The recording dialog may also offer shortcut managing functionalities, e.g. functionalities such as delete shortcuts and modify shortcuts. In embodiments where multiple resources are associated with a shortcut, the shortcut modification facilities can be used to, for example, delete one or more of the plurality of resources currently associated with the shortcut. Likewise, one or more resources can be associated with the shortcut using the modification facilities. If the session is interrupted (i.e. shut down due to some error) dynamic shortcuts are not lost since each time a shortcut is created or modified information concerning the creation or modification is saved in a temporary file. A recovery dialog will be launched automatically at the start of next session to help recover the shortcuts. Within a session a user can load shortcuts that were recorded during an earlier session with a given key combination (e.g. "My own"+X or Ctrl+Shift+X) and these loaded shortcuts are then usually merged with current shortcuts. However, the way how loaded shortcuts are handled and how possible conflicts between loaded and pre-existing shortcuts are handled depend on user-definable settings. Dynamic shortcuts of the session can be finally saved with a specific key combination (e.g. "My own"+S or Ctrl+Shift+S).

Figure 4:
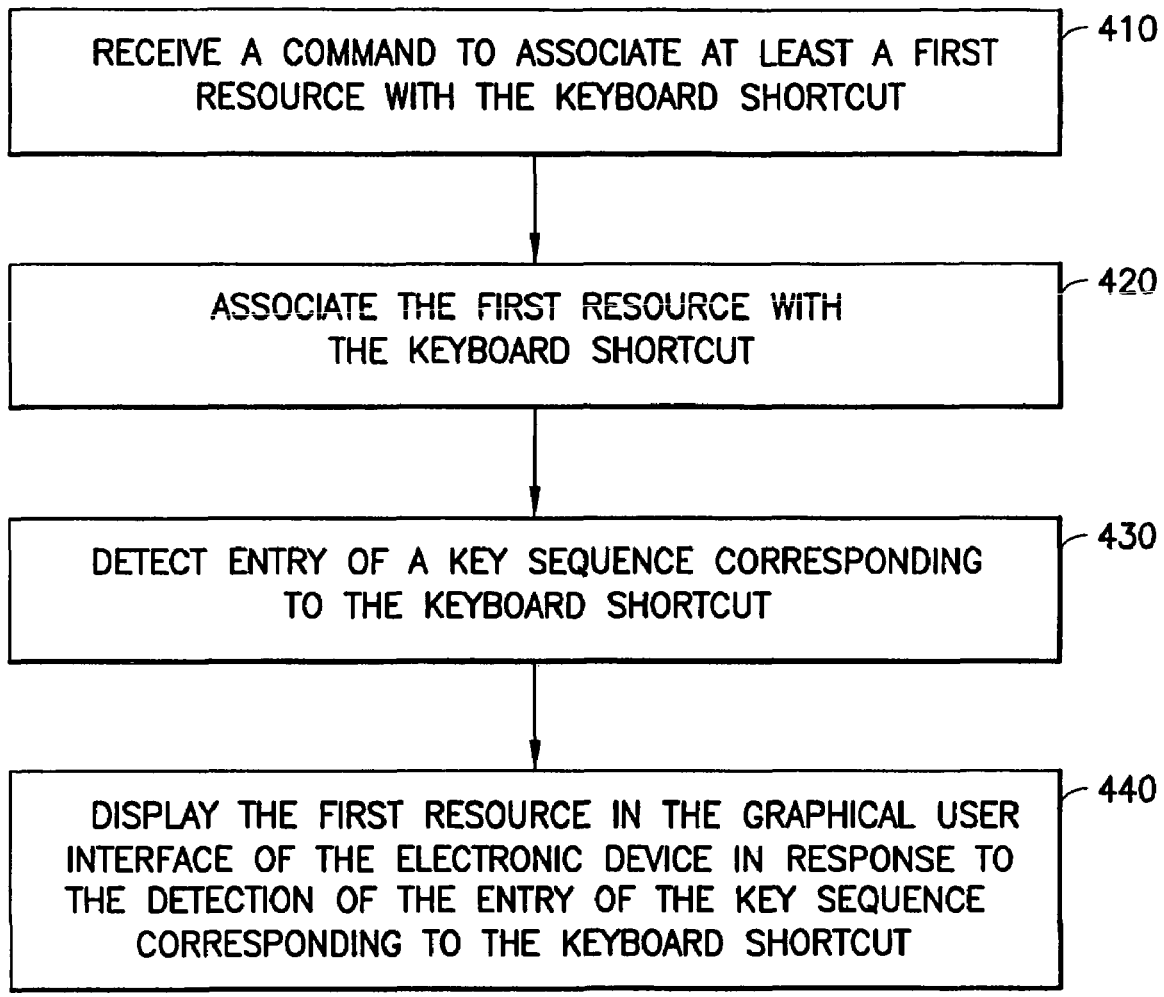
FIG. 4 is a flowchart depicting a method operating in accordance with the invention.
Figure 5:
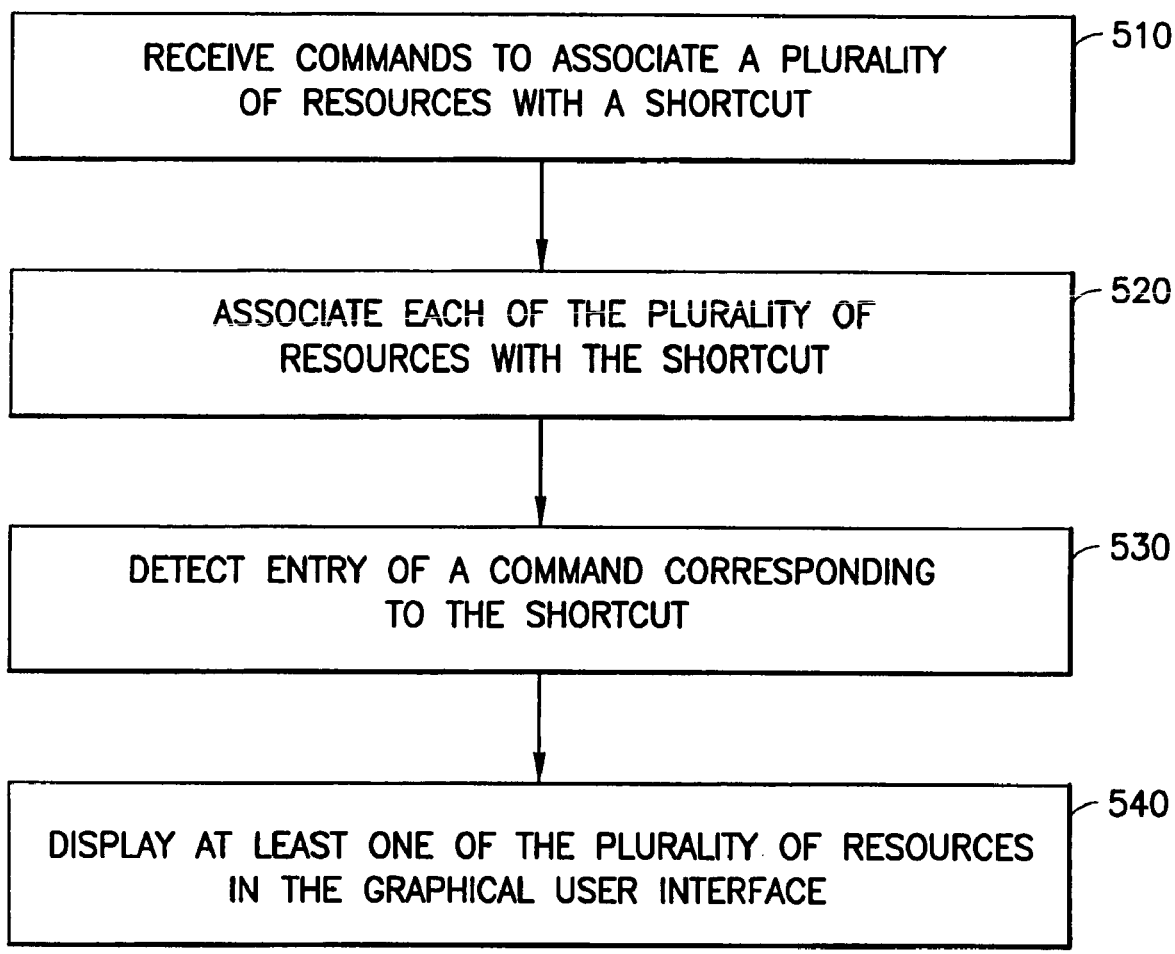
FIG. 5 is a flowchart depicting a method operating in accordance with the invention.

FIGS. 4 and 5 are flowcharts depicting methods operating in accordance with the invention. The following discussion concerning FIGS. 4 and 5 will summarize the salient aspects of the invention. FIG. 4 concerns a method that operates using shortcuts created for keypads or keyboards, and thus is suitable for use in the cellular telephone 110 or the desktop computer depicted in FIGS. 1A-B, or any other electronic device having a display for displaying a graphical user interface, and a keypad or keyboard for controlling operations of the electronic device, including operations concerning the graphical user interface. The discussion of FIG. 4 refers to resources. Generally, "resource" refers to any item that may be accessed using the electronic device and displayed in a graphical user interface of the electronic device, and includes, but is not limited to, web pages and windows spawned from application programs, functions implemented by application program windows, etc.

The method depicted in FIG. 4 occurs in a context where a user of an electronic device like those depicted in FIGS. 1A-B is surfing the web, or performing productivity operations using a window launched from an application program. At step 410, the user determines that she would like to associate a first resource such as, for example, a web page or application program window, with a keyboard shortcut. Accordingly, she enters a command to associate the first resource with the keyboard shortcut. Software performing operations to implement the method in the electronic device then associates the first resource with the keyboard shortcut at step 420. Later, after the user has navigated away from the first resource, the user decides to return to the first resource by entering the keyboard shortcut. This causes the software being executed by a digital processor of the electronic device to detect entry of the key sequence corresponding to the keyboard shortcut at step 430. Then, at step 440, the software responds to the user's desire to display the first resource again, by displaying the first resource in the graphical user interface of the electronic device.

As indicated previously, the first resource can be a web page; an application window; etc. In a variant of the method depicted in FIG. 4, the shortcut is associated with a particular portion of a resource (e.g., web page). This means that when a user desires to return to the resource and enters a command using the keyboard shortcut, the particular portion of the resource associated with the keyboard shortcut is displayed in the graphical user interface. This can be accomplished by highlighting the particular portion of the resource before associating the resource with the keyboard shortcut. Information related to the highlighting is then saved to computer memory so that when the shortcut is used, it displays the highlighted portion of the resource.

In various embodiments of the invention, the keyboard shortcut is associated with either a single, or a plurality of, resources. A particular advantage of the invention is that the information identifying the resource or resources associated with the keyboard shortcut is updated on-the-fly. If the keyboard shortcut can only be associated with a single resource at a time, when the user enters a command to enter a new resource to be associated with the keyboard shortcut, the new resource replaces the previous resource associated with the keyboard shortcut. This is accomplished in like manner to the method depicted in FIG. 4. First, the electronic device receives a command to associate a second resource with the keyboard shortcut, thereby replacing a first resource originally associated with the keyboard shortcut. Then, the software implementing the method of the invention associates the second resource with the keyboard shortcut. It is assumed at some point the user navigates away from the second resource, and then later decides to return to the second resource. At this point the user enters a key sequence corresponding to the keyboard shortcut. The software implementing the method of the invention detects the key sequence corresponding to the keyboard shortcut and displays the second resource in the graphical user interface of the electronic device.

In an alternate embodiment, a plurality of resources may be associated with a particular keyboard shortcut. In embodiments operating in this manner, as the user comes across a new web page or application window she wishes to associate with the keyboard shortcut, she enters a command to associate the new web page or application window with the keyboard shortcut. Thus, several or more web pages or application windows may become associated with a particular keyboard shortcut. This illustrates several advantageous aspects of the invention. First, since more than one keyboard shortcut can be created in embodiments of the invention, a user can rapidly return to a collection of web pages or application windows, or switch between a collection of web pages or application windows. Second, when a keyboard shortcut command is entered to recall a collection of web pages, other navigation tools (such as, for example, back/forward navigation commands) can be refreshed so that they too become associated with the collection of web pages associated with the keyboard shortcut. The user can then rapidly navigate back and forth through the web pages comprising the collection using back/forward commands. Third, a keyboard shortcut and information identifying resources associated with the keyboard shortcut can be saved for use at a later time. Thus, when a user begins a new computer session, the user can rapidly recall the web pages or application windows that he is interested in by recalling the saved keyboard shortcut.

This aspect of the invention operates as follows. It is assumed that a user has already associated a first resource with a keyboard shortcut. The user continues to access web pages or application windows and eventually identifies a second resource that he wishes to associate with the keyboard shortcut. The user then enters a command to associate the second resource with the keyboard shortcut. The computer software implementing the method of the invention receives the command to associate at least a second resource with the keyboard shortcut; and, as a result, associates the second resource with the keyboard shortcut. Again it is assumed that the user at some point navigates away from the first and second resources and decides to return to them. At this point the user enters a key sequence corresponding to the keyboard shortcut. The software implementing the method of the invention detects the key sequence corresponding to the keyboard shortcut and displays at least one or both of the first and second resource in the graphical user interface of the electronic device. In embodiments where the arrangement, position, placement and size of the first and second resources in the graphical user interface are saved as part of creation of the shortcut, if a display device is capable of simultaneously displaying both the first and second resource, then the first and second resource are displayed in accordance with the saved arrangement, position and size information when the keyboard shortcut is selected. This is particularly advantageous with large displays as the user can program the shortcut to display combinations of web pages and application program windows in a pre-determined manner. Users who have to monitor several dynamically changing resources simultaneously such as financial or security information would be particularly benefited by this feature.

Other navigation tools can be programmed in such a way so that they are tied to the keyboard shortcut. For example, if the electronic device has a back/forward control for navigating back and forth through a collection of web pages or application windows, the back/forward control can be tied to detection of a keyboard shortcut. If entry of a key sequence corresponding to a keyboard shortcut is detected, the resources currently associated with the back/forward controls would be cleared, and the back/forward control would then become associated with the plurality of resources tied to the keyboard shortcut. As a result a user would be able to use the back/forward control to navigate back and forth through the collection of web pages and/or application windows comprising the plurality of resources associated with the keyboard shortcut. This illustrates a particular advantage of the invention, since a user can associate resources drawn from diverse sources with a keyboard shortcut, such as, for example both a web page and an application window. Using the back/forward controls the user would be able to alternately display a webpage and application program window in the graphical user interface of the electronic device.

Another advantage of the invention is that if the resource associated with the keyboard shortcut is a window launched from an application program, methods of the invention can save the state condition of the window launched from the application program. As a result, if a user was performing a productivity task using the window, and completed only a portion of the task, not only would the method of the invention save the window along with the keyboard shortcut, the method would also save the current state of the window. This may include what file was being worked on; what tool bars were open, etc. Accordingly, when a key sequence corresponding to the keyboard shortcut is detected, the window would be displayed in accordance with its state when it was associated with the keyboard shortcut. This is a particular advantage of the invention when a user employs this feature at the end of a computer session so that the user can immediately return to the place where the user left off in the next computer session.

An embodiment implementing this aspect of the invention will now be described. It is assumed that a user has associated a window launched from an application program with a keyboard shortcut, and then saved this information to a memory of the electronic device for use in a later productivity session. The software implementing this aspect of the invention would then perform the following steps. First, a user would enter a command to retrieve the keyboard shortcut from memory. The software implementing the method of this embodiment would perform a step where it receives the command to retrieve the keyboard shortcut from memory. Then, at some point the user would enter a key sequence corresponding to the keyboard shortcut. The software implementing the method would receive the key sequence corresponding to the keyboard shortcut; retrieve the state information associated with the window of the application program associated with the keyboard shortcut, and then display the window of the application program associated with the keyboard shortcut in accordance with the state information.

FIG. 5 is a flowchart depicting another method operating in accordance with the invention. The invention can be practiced with shortcuts implemented with functionality other than keyboards and keypads. For example, a plurality of resources such as, for example, web pages and windows launched from application programs can be associated with an icon accessible from, for example, an operating system desktop. The method depicted in FIG. 5 operates as follows. Prior to the beginning of the method, a user is employing an electronic device to surf the web or to perform productivity tasks using windows launched from application programs. At various points, the user decides that he would like to associate a particular resource with a shortcut. At each of these points, the user enters a command to associate the particular resource under consideration with the shortcut. Then, the software implementing this embodiment of the invention performs an operation at step 510, where it receives commands to associate a plurality of resources with a shortcut. As discussed previously, the shortcut can correspond to an icon which can be accessed from the desktop; or it may correspond to a keyboard shortcut; or it may correspond to some other functionality associated with the electronic device which can be used for navigation purposes. For example, shortcuts could be implemented with a pointing device like a mouse, track ball, stylus, touch pad, etc. In such embodiments, the shortcut could be implemented in combination with icons or control buttons. Alternatively, the shortcut could be accessed by entry of a particular pattern or figure entered with the pointing device. After the software receives each command to associate a resource with the shortcut, then at step 520, the software performs an operation to associate each of the plurality of resources with the shortcut. It is then assumed that the user navigates away from the resources associated with the shortcut, and then decides at a later time to return to the resources by entering a command corresponding to the shortcut. At this point, the software performs step 530 where it detects entry of a command corresponding to the shortcut, and in response the software performs step 540 to display at least one of the plurality of resources associated with the shortcut in the graphical user interface.

One of ordinary skill in the art will understand that the methods depicted and described herein can be embodied in a tangible computer-readable memory medium. Instructions embodied in the tangible computer-readable memory medium perform the steps of the method when executed. Tangible computer-readable memory media include, but are not limited to, hard drives, CD- or DVD-ROM, flash memory storage devices or in a RAM memory of a computer system or electronic device such as, for example, a cellular telephone.

Thus it is seen that the foregoing description has provided by way of exemplary and non-limiting examples a full and informative description of the best methods and apparatus presently contemplated by the inventor for implementing dynamic shortcuts for use in rapidly accessing web content and application program windows. One skilled in the art will appreciate that the various embodiments described herein can be practiced individually; in combination with one or more other embodiments described herein; or in combination with interactive graphical user interfaces differing from those described herein. Further, one skilled in the art will appreciate that the invention can be practiced by other than the described embodiments; that these described embodiments are presented for the purposes of illustration and not of limitation; and that the invention is therefore limited only by the claims which follow.

What is claimed is:

1. A memory medium storing a computer program executable by a digital processor of an electronic device, the electronic device having a display for displaying a graphical user interface, wherein when the computer program is executed by the digital processor operations are performed for creating a keyboard shortcut for navigating between resources capable of being displayed in the graphical user interface, the operations comprising:

receiving a command to associate at least a first resource with the keyboard shortcut;

associating the first resource with the keyboard shortcut;

receiving a command to associate at least a second resource with the keyboard shortcut;

associating the second resource with the keyboard shortcut while maintaining the association of the first resource with the keyboard shortcut so that both the first and second resource can be accessed with the keyboard shortcut, wherein when the second resource is associated with the keyboard shortcut both the first resource and the second resource are visible in the graphical user interface of the electronic device and are arranged within the graphical user interface in accordance with a user-specified arrangement;

saving arrangement information describing the user-specified arrangement of the first resource and the second resource within the graphical user interface at the time the second resource is associated with the keyboard shortcut;

detecting entry of a key sequence corresponding to the keyboard shortcut associated with the first and second resource; and displaying both the first resource and the second resource in the graphical user interface of the electronic device in response to the detection of the entry of the key sequence corresponding to the keyboard shortcut, wherein the first resource and the second resource are displayed in accordance with the user-specified arrangement described in the arrangement information.

2. The memory medium of claim 1 wherein the first resource is a web page.

3. The memory medium of claim 2 wherein the command to associate at least a first resource with the keyboard shortcut further comprises a command to associate a particular portion of the web page with the keyboard shortcut; wherein associating the first resource with the keyboard shortcut further comprises associating the particular portion of the web page with the keyboard shortcut; and wherein displaying the first resource in the graphical user interface further comprises displaying the particular portion of the web page in the graphical user interface.

4. The memory medium of claim 1 wherein the first resource is a window associated with an application program.

5. The memory medium of claim 1 wherein the command to associate at least a first resource with the keyboard shortcut further comprises a command to associate a particular portion of the first resource with the keyboard shortcut; wherein associating the first resource with the keyboard shortcut further comprises associating the particular portion of the first resource with the keyboard shortcut; and wherein displaying the first resource in the graphical user interface further comprises displaying the particular portion of the first resource in the graphical user interface.

6. The memory medium of claim 1 wherein the first resource is a web page and wherein the second resource is a window associated with an application program.

7. The memory medium of claim 1 wherein the electronic device further comprises a back/forward control for navigating between resources capable of being displayed in the graphical user interface, the operations further comprising:

when entry of a key sequence corresponding to the keyboard shortcut associated with the first and second resource is detected, clearing resources currently associated with the back/forward control of the electronic device; and associating the first and second resource with the back/forward control of the electronic device.

8. The memory medium of claim 1 wherein the operations further comprise:

saving the keyboard shortcut and identity information identifying the first resource associated with the keyboard shortcut to a memory of the electronic device.

9. The memory medium of claim 4 wherein the application program window has a state condition, whereby when the application program window is associated with the keyboard shortcut, information concerning the state condition of the application program window is saved to a memory of the electronic device.

10. The memory medium of claim 9 wherein when a key sequence corresponding to the keyboard shortcut is detected, the application program window associated with the keyboard shortcut is retrieved and returned to the state condition indicated by the information saved in the memory of the electronic device.

11. The memory medium of claim 8 whereby the first resource is a window associated with an application program, the window having a state condition, wherein when the keyboard shortcut and identity information concerning the first resource associated with the keyboard shortcut are saved to the memory of the electronic device, information concerning a current state of the window is also saved to the memory of the electronic device.

12. The memory medium of claim 11 wherein the operations further comprise:
   receiving a command to retrieve the keyboard shortcut from memory;
   receiving a key sequence corresponding to the keyboard shortcut;
   retrieving the state information associated with the window of the application program associated with the keyboard shortcut; and
   displaying the window of the application program associated with the keyboard shortcut in accordance with the state information.

13. The memory medium of claim 1 wherein the operations further comprise:
   saving the keyboard shortcut and identity information identifying the first and second resource associated with the keyboard shortcut to a memory of the electronic device.

14. The memory medium of claim 13 wherein the operations further comprise:
   receiving a command to retrieve the keyboard shortcut from memory;
   receiving a key sequence corresponding to the keyboard shortcut; and
   displaying at least one of the first or second resource in the graphical user interface of the electronic device.

15. The memory medium of claim 13 wherein the first and second resources are windows associated with at least one application program, the windows each having a state condition, whereby when the keyboard and identity information concerning the first and second resources associated with the keyboard shortcut are saved to the memory of the electronic device, information concerning a current state of each window is also saved to the memory of the electronic device.

16. The memory medium of claim 15 wherein the operations further comprise:
   receiving a command to retrieve the keyboard shortcut from memory;
   receiving a key sequence corresponding to the keyboard shortcut;
   retrieving the state information associated with the windows of the at least one application program; and
   displaying at least one of the windows associated with the keyboard shortcut in accordance with the state information.

17. The memory medium of claim of claim 14 wherein the electronic device further comprises a back/forward control for navigating between resources capable of being displayed in the graphical user interface, the operations further comprising:
   when entry of a key sequence corresponding to the keyboard shortcut associated with the first and second resource is detected, clearing resources currently associated with the back/forward control of the electronic device; and
   associating the first and second resource with the back/forward control of the electronic device.

18. The memory medium of claim 1 wherein receiving commands to associate at least a first resource and a second resource with the keyboard shortcut further comprises receiving commands to associate a plurality of resources with the keyboard shortcut, at least a portion of each of the resources capable of being displayed in the graphical user interface simultaneously; and wherein displaying both the first resource and the second resource in the graphical user interface in response to the detection of the entry of the key sequence further comprises simultaneously displaying at least a portion of each of the plurality of resources in the graphical user interface in accordance with the arrangement information.

19. The memory medium of claim 1 wherein a function capable of being performed by the electronic device may be associated with a keyboard shortcut, the operations further comprising,
   prior to detecting entry of a key sequence corresponding to the keyboard shortcut, receiving a command to associate the function of the electronic device with the keyboard shortcut; and
   after detecting entry of the key sequence corresponding to the keyboard shortcut associated with the first resource, implementing the function of the electronic device associated with the keyboard shortcut.

20. The memory medium of claim 1 wherein the keyboard shortcut is session-specific, whereby the operations further comprise:
   in conjunction with powering down the electronic device, purging information associating the first resource with the keyboard shortcut, thereby clearing the keyboard shortcut.

21. A memory medium storing a computer program executable by a digital processor of an electronic device, the electronic device having a display for displaying a graphical user interface, wherein when the computer program is executed by the digital processor operations are performed for creating a shortcut for navigating between resources capable of being displayed in the graphical user interface, the operations comprising:
   receiving commands to associate a plurality of resources with the shortcut;
   associating each of the plurality of resources with the shortcut, wherein when each of the plurality of resources is associated with the shortcut at least two resources of the plurality of resources are visible in the graphical user interface of the electronic device and are arranged within the graphical user interface in accordance with a user-specified arrangement;
   saving arrangement information describing the user-specified arrangement of the at least two resources within the graphical user interface at the time each of the plurality of resources is associated with the shortcut;
   detecting entry of a command corresponding to the shortcut; and
   displaying at least the at least two resources in the graphical user interface in accordance with the user-specified arrangement described in the arrangement information.

22. The memory medium of claim 21 wherein at least one of the plurality of resources is a web page.

23. The memory medium of claim 21 wherein at least one of the plurality of resources is a window associated with an application program.

24. The memory medium of claim 21 wherein the shortcut is activated using an icon displayed in the graphical user interface.

25. The memory medium of claim 21 wherein the shortcut is activated with a key sequence entered using keys of a keyboard.

26. The memory medium of claim 21 wherein the shortcut is activated by entering a figure with a pointing device.

27. The memory medium of claim 21 wherein the shortcut is activated using keys of a remote control.

28. The memory medium of claim 21 wherein the shortcut is activated using controls of a data glove.

29. The memory medium of claim 21 wherein the operations further comprise:
saving the shortcut and identity information concerning the plurality of resources associated with the shortcut to a memory of the electronic device.

30. The memory medium of claim 29 wherein the operations further comprise:
receiving a command to retrieve the shortcut from memory; and
receiving a command corresponding to the shortcut.

31. The memory medium of claim 30 wherein the electronic device further comprises a back/forward control for navigating between resources capable of being displayed in the graphical user interface, the operations further comprising:
when entry of a command corresponding to the shortcut associated with the plurality of resources is detected, clearing resources currently associated with the back/forward control of the electronic device; and
associating the plurality of resources with back/forward control of the electronic device.

32. The memory medium of claim 31 wherein the operations further comprise:
detecting entry of a back/forward command entered using the back/forward control of the electronic device; and
displaying a next one of the plurality of resources in the graphical user interface of the electronic device after entry of the back/forward command.

33. The memory medium of claim 21 wherein at least a portion of each of the resources associated with the shortcut is capable of being displayed in the graphical user interface simultaneously; wherein associating each of the plurality of resources with the shortcut further comprises saving arrangement information indicating how the plurality of resources are to be arranged in the graphical user interface when the plurality of resources are simultaneously displayed; and wherein displaying at least the at least two resources in the graphical user interface in response to the detection of the entry of a command corresponding to the shortcut further comprises simultaneously displaying at least a portion of each of the plurality of resources in the graphical user interface in accordance with the arrangement information.

34. The memory medium of claim 21 wherein a function capable of being performed by the electronic device may be associated with a shortcut, the operations further comprising,
prior to detecting entry of a command corresponding to the shortcut, receiving a command to associate the function of the electronic device with the shortcut; and
after detecting entry of the command corresponding to the shortcut associated with the plurality of resources, implementing the function of the electronic device associated with the shortcut.

35. The memory medium of claim 21 wherein the keyboard shortcut is session-specific, whereby the operations further comprise:
in conjunction with powering down the electronic device, purging information associating the plurality of resources with the shortcut, thereby clearing the shortcut.

36. An electronic device comprising:
at least one memory for storing a computer program;
a display for displaying a graphical user interface operable to display resources accessed using the electronic device;
an input device for entering commands to control the electronic device; and
a processing apparatus coupled to the at least one memory, display and the input device for executing the computer program stored in the at least one memory, wherein when the program is executed operations are performed for creating a shortcut using the input device, the shortcut for navigating between resources capable of being displayed in the graphical user interface, the operations comprising:
receiving commands to associate a plurality of resources with the shortcut;
associating each of the plurality of resources with the shortcut, wherein when each of the plurality of resources is associated with the shortcut at least two resources of the plurality of resources are visible in the graphical user interface of the electronic device and are arranged within the graphical user interface in accordance with a user-specified arrangement;
saving arrangement information describing the user-specified arrangement of the at least two resources within the graphical user interface at the time each of the plurality of resources is associated with the shortcut;
detecting entry of a command corresponding to the shortcut; and
displaying at least the at least two resources in the graphical user interface in accordance with the user-specified arrangement described in the arrangement information.

37. The electronic device of claim 36 wherein the input device comprises at least one of a keypad or keyboard and wherein the shortcut corresponds to at least one keystroke entered using the at least one of the keypad or keyboard.

38. The electronic device of claim 36 wherein the shortcut corresponds to an icon displayed by graphical user interface of the electronic device.

39. The electronic device of claim 36 wherein one of the plurality of resources is a web page.

40. The electronic device of claim 36 wherein one of the plurality of resources is an application program window.

41. A method for creating a keyboard shortcut for navigating between resources capable of being displayed on a graphical user interface, the method comprising:
receiving a command to associate at least a first resource with the keyboard shortcut;
associating the first resource with the keyboard shortcut;
receiving a command to associate at least a second resource with the keyboard shortcut;
associating the second resource with the, keyboard shortcut while maintaining the association of the first resource with the keyboard shortcut so that both the first and second resource can be accessed with the keyboard shortcut, wherein when the second resource is associated with the keyboard shortcut both the first resource and the second resource are visible in the graphical user interface of the electronic device and are arranged within the graphical user interface in accordance with a user-specified arrangement;
saving arrangement information describing the user-specified arrangement of the first resource and the second resource within the graphical user interface at the time the second resource is associated with the keyboard shortcut;

detecting entry of a key sequence corresponding to the keyboard shortcut associated with the first and second resource; and displaying both the first resource and the second resource in the graphical user interface of the electronic device in response to the detection of the entry of the key sequence corresponding to the keyboard shortcut, wherein the first resource and the second resource are displayed in accordance with the user-specified arrangement described in the arrangement information.

42. The method of claim 41 wherein the first resource is a web page.

43. A method for creating a shortcut for navigating between resources capable of being displayed in a graphical user interface, the method comprising:

receiving commands to associate simultaneously a plurality of resources with the shortcut;

associating each of the plurality of resources with the shortcut, wherein when each of the plurality of resources is associated with the shortcut at least two resources of the plurality of resources are visible in the graphical user interface of the electronic device and are arranged within the graphical user interface in accordance with a user-specified arrangement;

saving arrangement information describing the user-specified arrangement of the at least two resources within the graphical user interface at the time each of the plurality of resources is associated with the shortcut;

detecting entry of a command corresponding to the shortcut; and displaying at least the at least two resources in the graphical user interface in accordance with the user-specified arrangement described in the arrangement information.

44. The method of claim 43 wherein at least one of the plurality of resources comprises a web page.

45. An electronic device comprising:

memory means for storing at least a computer program;

display means for displaying a graphical user interface operable to display resources accessed using the electronic device;

input device means for entering commands to control the electronic device; and processor means coupled to the memory means, display means and input means for executing the computer program stored in the at least one memory, wherein when the program is executed operations are performed for creating a shortcut using the input device, the shortcut for navigating between resources capable of being displayed in the graphical user interface, the operations comprising:

receiving commands to associate a plurality of resources with the shortcut;

associating each of the plurality of resources with the shortcut, wherein when each of the plurality of resources is associated with the shortcut at least two resources of the plurality of resources are visible in the graphical user interface of the electronic device and are arranged within the graphical user interface in accordance with a user-specified arrangement;

saving arrangement information describing the user-specified arrangement of the at least two resources within the graphical user interface at the time each of the plurality of resources is associated with the shortcut;

detecting entry of a command corresponding to the shortcut; and displaying at least the at least two resources in the graphical user interface in accordance with the user-specified arrangement described in the arrangement information.

46. The electronic device of claim 45 wherein at least one of the plurality of resources comprises a web page.

47. A memory medium storing a computer program executable by a digital processing apparatus of an electronic device, the electronic device having a display for displaying a graphical user interface, wherein when the computer program is executed by the digital processing apparatus operations are performed for creating a shortcut both for navigating to at least two resources capable of being displayed in the graphical user interface and for implementing at least one function of the electronic device, the operations comprising:

receiving a command to associate the at least two resources with the shortcut;

associating the at least two resources with the shortcut, wherein when the at least two resources are associated with the shortcut the at least two resources are visible in the graphical user interface of the electronic device and are arranged within the graphical user interface in accordance with a user-specified arrangement;

saving arrangement information describing the user-specified arrangement of the at least two resources within the graphical user interface at the time the at least two resources are associated with the shortcut;

receiving a command to associate the at least one function of the electronic device with the shortcut;

further associating the at least one function with the shortcut;

detecting a command corresponding to activation of the shortcut;

displaying the at least two resources in the graphical user interface of the electronic device in accordance with the user-specified arrangement described in the arrangement information; and implementing the at least one function of the electronic device.

* * * * *

UNITED STATES PATENT AND TRADEMARK OFFICE
CERTIFICATE OF CORRECTION

PATENT NO. : 7,539,795 B2  Page 1 of 1
APPLICATION NO. : 11/343603
DATED : May 26, 2009
INVENTOR(S) : Vahtola It is certified that error appears in the above-identified patent and that said Letters Patent is hereby corrected as shown below:

IN THE CLAIMS:

Claim 9, column 14, line 54, please delete "wherein" and replace with --where--.

Claim 9, column 14, line 55, please delete "whereby" and replace with --wherein--.

Claim 11, column 14, line 66, please delete "whereby" and replace with --where--.

Claim 15, column 15, line 33, please delete "wherein" and replace with --where--.

Claim 15, column 15, line 36, please delete "whereby" and replace with --wherein--.

Claim 20, column 16, line 22, please delete "wherein" and replace with --where--.

Claim 20, column 16, line 23, please delete "whereby" and replace with --and wherein--.

Claim 21, column 16, line 37, after "associate" please insert --simultaneously--.

Claim 35, column 17, line 57, please delete "wherein" and replace with --where--.

Claim 35, column 17, line 58, please delete "whereby" and replace with --and wherein--.

Claim 36, column 18, line 14, after "associate" please insert --simultaneously--.

Claim 45, column 19, line 51, after "associate" please insert --simultaneously--.

Signed and Sealed this

Twenty-eighth Day of July, 2009

JOHN DOLL
*Acting Director of the United States Patent and Trademark Office*